United States Patent

Marguth, Jr.

[15] 3,684,832

[45] Aug. 15, 1972

[54] ACOUSTICAL DATA SET/TERMINAL TESTER

[72] Inventor: Gilbert R. Marguth, Jr., Livermore, Calif.

[73] Assignee: Livermore Data Systems Inc., Livermore, Calif.

[22] Filed: March 6, 1970

[21] Appl. No.: 17,051

[52] U.S. Cl. .......... 179/2 DP

[51] Int. Cl. .......... H04m 11/06

[58] Field of Search .... 179/2 DP, 3, 4, 1 C, 2 C, 175; 178/58, 66

[56] References Cited

UNITED STATES PATENTS

| | | | |
|---|---|---|---|
| 3,507,997 | 4/1970 | Weitbrecht | 179/2 DP |
| 3,403,225 | 9/1968 | Mislan et al | 179/2 R |
| 3,076,056 | 1/1963 | Stoffels | 179/3 |
| 3,544,721 | 12/1970 | Geen | 179/2 DP |
| 3,524,935 | 8/1970 | Gonsewski | 179/2 DP |
| 3,517,137 | 6/1970 | Ribner | 179/2 DP |
| 3,515,806 | 6/1970 | Spraker | 179/2 DP |
| 3,227,806 | 1/1966 | Krevzer | 179/3 |
| 3,388,375 | 6/1968 | Sloughter | 179/2 C |
| 3,417,202 | 12/1968 | Isolpek | 179/3 |
| R26,396 | 6/1968 | Stoffels | 179/3 |

*Primary Examiner*—Kathleen H. Claffy
*Assistant Examiner*—Tom D'Amico
*Attorney*—Limbach, Limbach & Sutton

[57] ABSTRACT

A device for monitoring, recording, interfacing, and otherwise processing data in FSK or bilevel DC form including interfaces for telephone handsets, business machines, and teletype terminals, a data set, one or more magnetic tape recorders, and switching functions for performing various operations in order to test terminal units, data lines and to save on-line time when working with time-shared computers.

6 Claims, 7 Drawing Figures

FIG. 2A FIG. 2B FIG. 2C

INVENTOR.
GILBERT R. MARGUTH JR.
BY
Limbach, Limbach & Sutton
ATTORNEYS

INVENTOR.
GILBERT R. MARGUTH JR.
BY
Limbach Limbach & Sutton
ATTORNEYS

INVENTOR.
GILBERT R. MARGUTH JR.
BY Limbach, Limbach and Sutton
ATTORNEYS

INVENTOR.
GILBERT R. MARGUTH JR.
BY
Limbach, Limbach & Sutton
ATTORNEYS

INVENTOR.
GILBERT R. MARGUTH JR.
BY
Limbach, Limbach & Sutton
ATTORNEYS

ACOUSTICAL DATA SET/TERMINAL TESTER

BACKGROUND OF THE INVENTION

This invention relates generally to apparatus for interfacing with various types of business machines, teletype terminals, remote computer terminals, telephone sets, and the like, for testing, exercising, using and performing other operative functions on and with such units and more particularly the invention relates to an acoustical data set/terminal tester (DS/TT) having means for interfacing with the devices described above and having self-contained recording and playback capabilities.

With the rapid expansion of computer and communications facilities, such as business machines for processing data, teletype units for communications to remote points, terminal units for access to remote time-shared computers, the need for simple and accurate test facilities becomes increasingly important. When operated by the computer or communications facility user, such a test device can pinpoint faults to save valuable down time. For example, if the user of a time-shared computer is experiencing trouble, it is desirable for him to know if the fault lies in his terminal, in the computer, in the connecting telephone lines or in the acoustical data set connecting a telephone line to his terminal. By rapidly pinpointing the source of trouble, repairs can be expedited without involving excessive down time of his terminal or costly use of the computer.

SUMMARY OF THE INVENTION

An acoustical data set/terminal tester is provided having interface capabilities with common business machines and terminal units. More specifically, an acoustical coupler is provided that is compatible with a telephone handset such as the Western Electric series 500 or similar units, four pin plugs are provided for interfacing with units containing the IBM (International Business Machine) modem (Modulator-Demodulator) unit or for other units having a telephone type four pin access, and standard EIA (Electronic Industry Association) RS–232B lines through 25 pin type D connection. Complete compatibility with existing units and compliance with tariff regulations regarding signal levels is easily achievable. The unit has a built-in data set of conventional design and can accept binary (two-lever) DC signals and convert them to frequency shift keying (FSK) signals at either 1,070/1,270 Hz or 2,025/2,225 Hz, the standard frequencies used for mark and space in modulated systems of the type encountered, thereby allowing the unit to act as either an answer or originate terminal. In addition the unit can demodulate FSK signals at the above-mentioned frequencies for reconversion to binary DC. Also, provision is made for the record and playback of FSK modulated signals. Various unique switching functions are provided, permitting great flexibility to test, simulate terminals, monitor, and record, often simultaneously as will be described hereinafter. Malfunctions can be diagnosed off line by either the customer or service engineers thus saving expense. The record/playback capability permits a time-saving function with respect to time-shared computers. For example, the unit can record debugged programs as they are dumped from the central processor and store them on magnetic tape for convenient entry into the computer. Many other uses and applications will become apparent as the following detailed description is read and understood.

DESCRIPTION OF THE PREFERRED EMBODIMENTS

Figure 1:
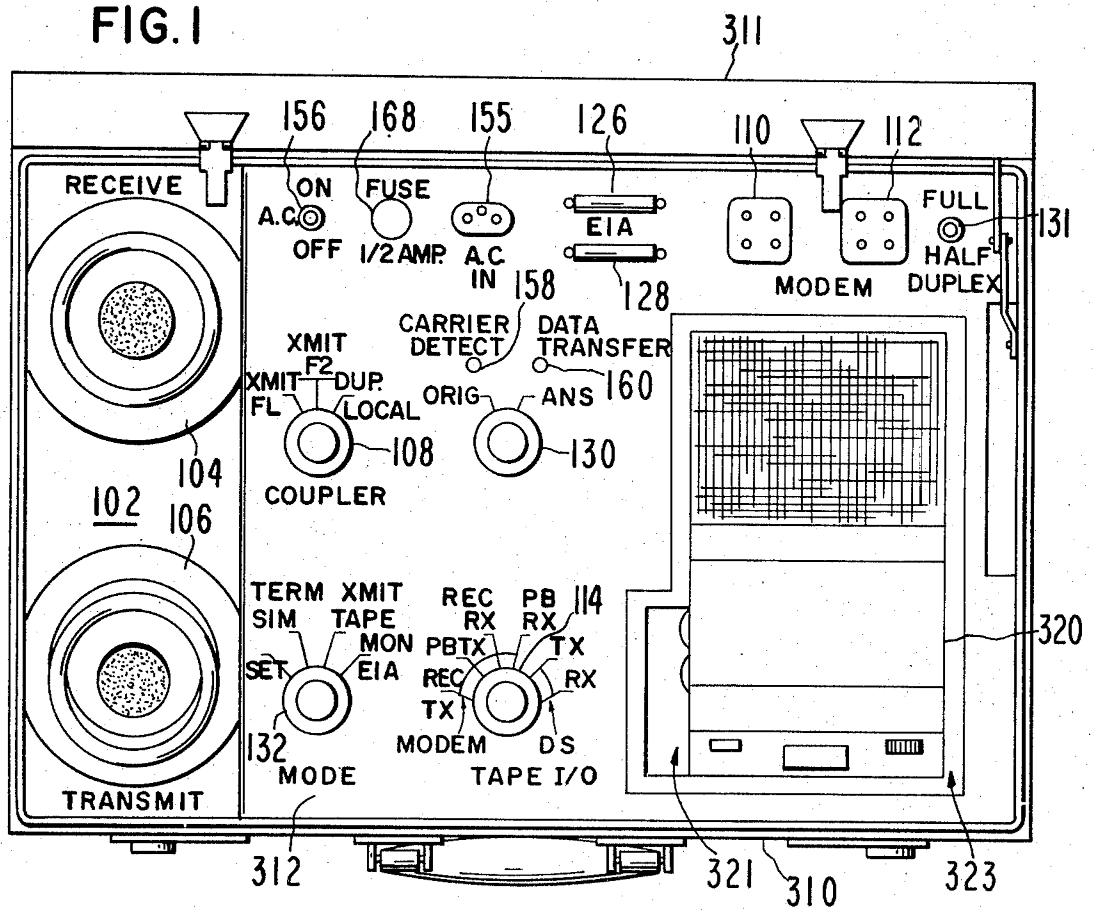
FIG. 1 is a diagram of a DS/TT unit according to one embodiment of the invention mounted in a portable carrying device, showing the main functions of the unit.

Referring now to the drawings, with particular reference to FIG. 1, there is shown an acoustical data set/terminal tester (DS/TT) according to the present invention in the form of a lightweight portable device which can be packaged in an attache case 310 with all of the functions of the device operable when the lid 311 to the case is in raised position as shown. The DS/TT includes structure and circuitry as described below for testing all the functions and operations of a terminal and other equipment associated with the terminal either on location or remote from the terminal.

As illustrated, the panel 312 of the DS/TT includes an acoustical coupler unit 102 having a receiving transducer 104, such as a microphone, and a transmitting transducer 106, such as a speaker, spaced apart and resiliently mounted on the panel 312 to receive a telephone handset (not shown). Also, the panel 312 includes conveniently located switches and plug connections for operating the DS/TT. At the top of the panel, the following elements are provided: an AC on/off switch 156, a fuse 168, a plug 155 to receive a standard three-wire AC power cord, EIA 25-pin jacks 126 and 128, a pair of four-pin pack 110 and 112 for connection to telephone lines and the like (i.e., MODEM connections), and a two-position switch 131.

Located centrally on the panel and for setting the DS/TT to operate in its various operational functions are the following switches: a three-section four-position acoustic coupler switch 108 for operating through the acoustic coupler 102; an originate-answer switch 130, a mode switch 132 for setting to the designated function of the instrument be it "DATA SET" for operation as an acoustically coupled data set, "TERM SIM." for operation as a terminal simulator, "XMIT TAPE" for transmitting from the recorded tape, or "MON EIA" for monitoring digital levels that are transferred between a terminal and another EIA compatible data set; a six-position "TAPE I/O" switch 114 for controlling the input or output of the tape recorder. The six-positions of the TAPE I/O switch 114 include four positions for operation with the MODEM receptacles 110 and 112 and two positions for operation with the data set. For operation with the MODEM, there are the "REC TX" record transmit position, the "PB TX" playback transmit position, the "REC RX" record receive position and the "PB RX" playback receive position. Carrier detect lamp 158 and data transfer lamp 160 provide visual indication of the unit's operation. For use with the data set, there are the transmit and receive positions.

At the lower right portion of panel 312 a magnetic tape recorder unit 320 is inserted in a recessed portion 321. Rubber or foam material 323 may be used to hold the unit in place. Unit 320 may be a monophonic cassette unit of the type having record and playback capabilities in the audio range of about 1,000 to 2,300 Hz.

Figure 2:
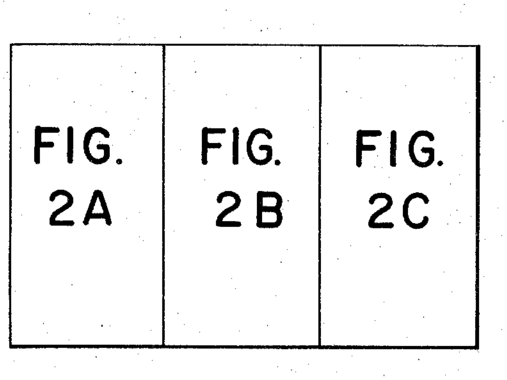
FIG. 2 is a block diagram representation of FIGS. 2A, 2B, 2C which taken together is a schematic circuit diagram of an embodiment of the DS/TT.
Figure 2A:
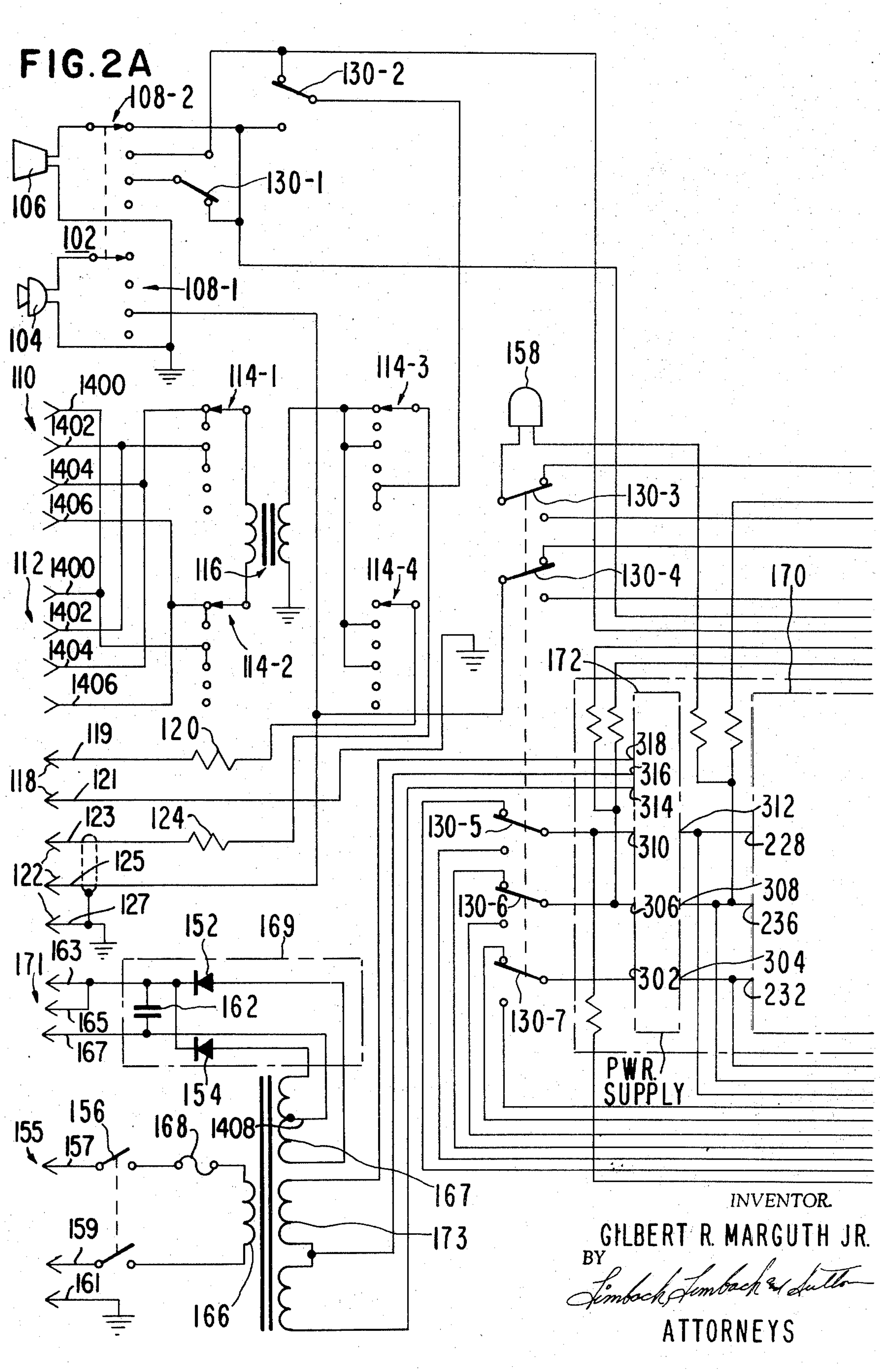
Figure 2B:
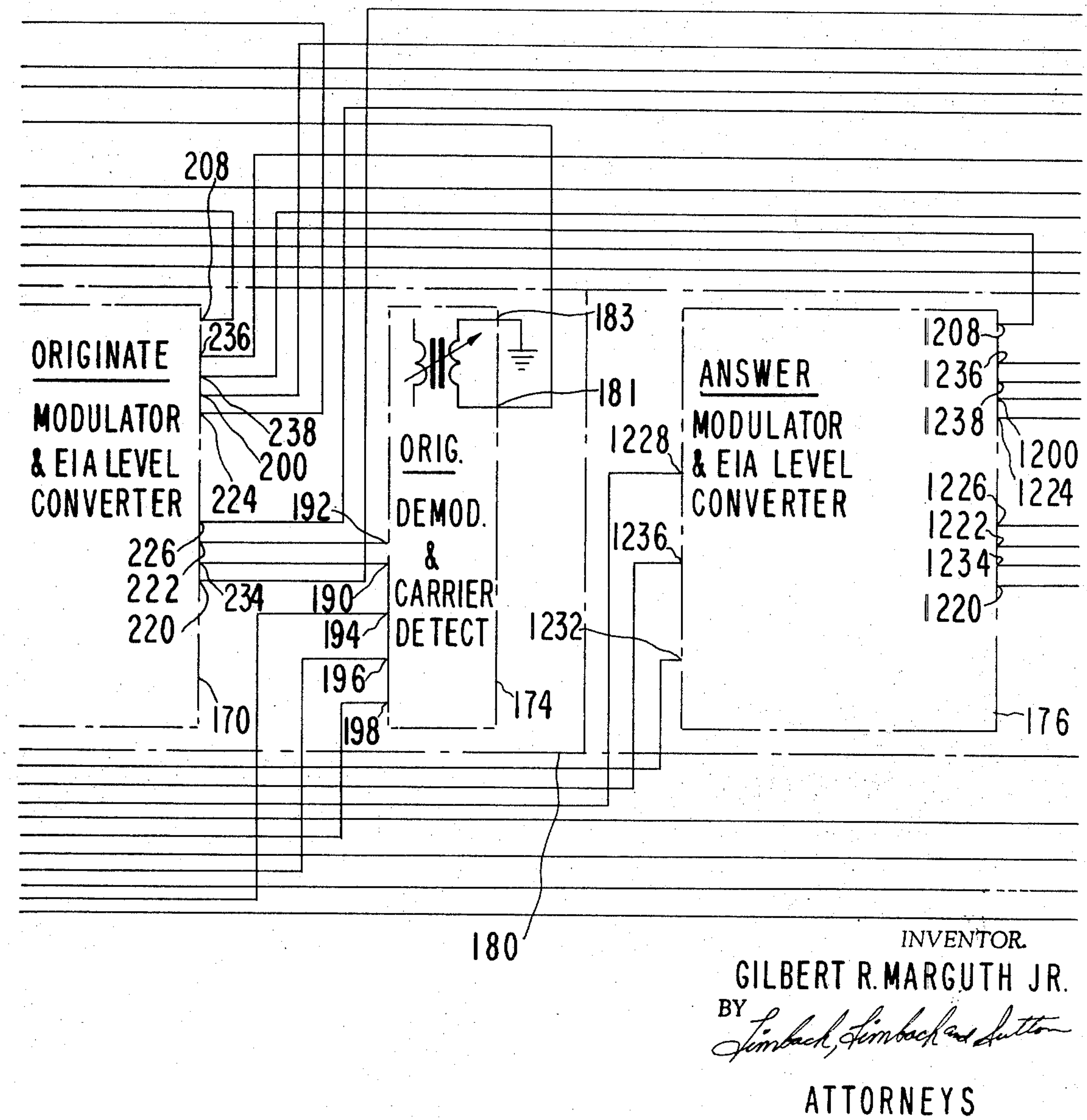
Figure 2C:
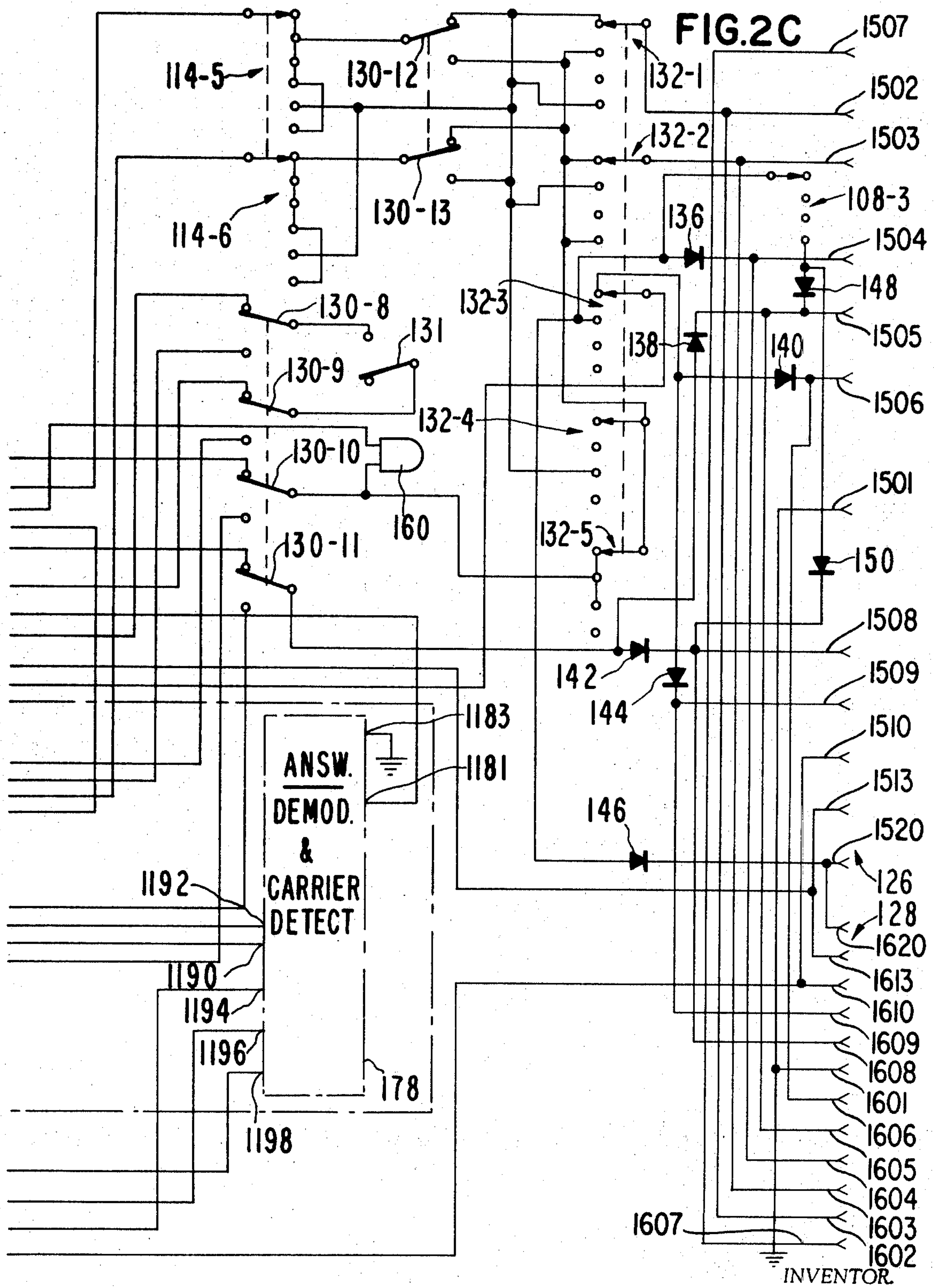

The functions mentioned above will become clearer as reference is made now to FIG. 2 wherein a schematic circuit diagram of the DS/TT according to the instant invention is shown. A first connection of microphone 104 and speaker 106, respectively, of acoustical coupler unit 102 is connected to ground. A three-section four-position switch 108 has the common connector of its first section 108–1 connected to the other terminal of receiver 104 and the common connector of 108–2 is connected to the other terminal of transmitter 106. The third section of 108, section 108–3, has its first position connected to the first position of section 132–3 of five-section switch 132. Throughout this specification the switch positions referred to are numbered in order from top to bottom on the drawing. A pair of four-pin jacks 110 and 112 are connected in parallel for connection to telephone lines or other dedicated lines having four-pin connectors. Pins 1400 of jacks 110 and 112 are connected to positions 3 and 4 of the second section 114–2 of four-section switch 114. Pins 1402 of jacks 110 and 112 are connected to positions 3 and 4 of the first section 114–1 of switch 114. The 1404 pins of jacks 110 and 112 are connected to positions 1 and 2 of the first section 114–1 of switch 114. The pins 1406 of jacks 110 and 112 are connected to positions 1 and 2 of the second section 114–2 of switch 114. Jack 118 has pins 119 and 121 connected respectively to the low impedance output of a tape recorder (described hereinafter). Pin 119 is connected through a resistor 120 to the common connection of the fourth section 114–4 of switch 114. The negative pin 121 is connected to ground. A three-pin jack 122 having pins 123, 125 and 127 is connected so that pin 123 is applied to the record input of the tape recorder, pin 125 is connected to the high impedance output of the tape recorder, and pin 127 is connected to the recorder ground. Pin 123 is connected through resistor 124 to the common connection of the third section 114–3 of switch 114. Pin 125 is connected to position 3 of section 1 108–1 of switch 108 and to the common connection of section 4 130–4 of 13-part switch 130. Twenty-five pin jacks 126 and 128 on parallel, having pins 1501 through 1510, 1513, and 1520 and pins 1601–1610, 1613 and 1620, respectively shown herein are connected as follows. Jacks 126 and 128 provide the standard EIA RS 232B interface connections. Pins 1501 and 1601 of jacks 126 and 128 are connected to ground pins 1502 and 1602 are connected to the common connector of the first section 132–1 of five section switch 132, pins 1053 and 1603 are connected to the common position of the second section 132–2 of switch 132, pins 1504 and 1604 are connected to the cathode of a diode 136, is connected to position 2 of the third section 132–3 of switch 132 and to the anode of diode 146 and the cathode of diode 146 is connected to pins 1520 and 1620 of jacks 126 and 128. Pins 1505 and 1605 of jacks 126 and 128 are connected first to the cathode of diode 148, the anode of which is connected to position 4 of the third section 108–3 of switch 108 and the anode is further connected to the anode of diode 150 which has its cathode connected to pins 1508 and 1608 of jacks 126 and 128, pins 1505 and 1605 are further connected to the cathode of diode 138 which has its anode connected first to the common position of section 11 130–11 of switch 130 and which is further connected to the anode of diode 142 which has its cathode connected to pins 1508 and 1608. Pins 1506 and 1606 are connected to the cathode of diode 140 which has its anode connected first to the anode of diode 144 which has its cathode connected to pins 1509 and 1609 and which is further connected to position 1 of the third section 132–3 of switch 132. Pins 1507 and 1607 are connected to ground. The connections to pins 1508 and 1608, 1509 and 1609 and 1520 and 1620 have been described, pins 1510 and 1610 are connected to the common connection of section 5 130–5 of switch 130 and pins 1513 and 1613 are connected to the common position of section 6 130–6 of switch 130.

Section 1, 130–1 switch 130, has its common connection connected to position 3 on the second section 108–2 of switch 108. Position 1 of 130–1 is connected first to position 1 of 130–2 and is connected to terminal 1208 of a modulator and EIA level converter 176 (described in detail hereinafter). Position 2 of 130–1 is connected first to position 1 of 108–2 and to position 2 of 130–2 and is further connected to terminal 208 of modulator and EIA level converter 170 (described in detail hereinafter). The common connection of 130–2 is connected to positions 5 and 6 of 114–3. The common connection of section 3 of switch 130, 130–3, is connected to a first connection on carrier detect lamp 158. Position 1 of 130–3 is connected to terminal 224 of modulator and EIA level converter 170. Position 2 of 130–3 is connected to terminal 1224 of modulator and EIA level converter 176. Position 1 of 130–4 is connected to terminal 181 of a demodulator and carrier detect unit 174 and position 2 of 130–4 is connected to terminal 1181 of a demodulator and carrier detect unit 178.

The common connection of 130–5 is connected to pins 1510 and 1610 of jacks 126 and 128 as described hereinbefore and is further connected to a −12 volt terminal 310 of a power supply 172. Position 1 of 130–5 is connected to terminal 194 of demodulator and carrier detect unit 174 and position 2 of 130–5 is connected to terminal 1194 of demodulator and carrier detect unit 178. The common connection 130–6 is connected to +12 volt terminal 306 of power supply 172. Position 1 of 130–6 is connected to terminal 196 of demodulator and carrier detect unit 174 and position 2 of 130–6 is connected to terminal 1194 of demodulator and carrier detect unit 178. The common connection of 130–7 is connected to ground terminal 302 of power supply 172. Position 1 of 130–7 is connected to terminal 198 of unit 174 and position 2 of 130–7 is connected to pins 1198 of unit 178. Section 8, 130–8 of switch 130 has its common connection to a position 1 of single pole single throw switch 131, position 1 of 130–8 is connected to terminal 238 of unit 170 and position 2 is connected to terminal 1238 of unit 176. Section 130–9 has its common connection to the other position of single pole single throw switch 131. Position 1 is connected to terminal 236 of unit 170 and position 2 is connected to terminal 1236 of unit 176. Switch section 130–10 has its common connection first to one terminal of data transfer lamp 160 and further to position 1, 2 and 3 of section 5, 133–5 of switch 132. Position 1 of 130–10 is connected to terminal 220 of unit 170 and position 2 is connected to terminal 1220 of unit 176.

Section 11, 130–11 has its common connection as indicated above to the anodes of diodes 138 and 142, position 1 is connected to terminal 226 of unit 170 and position 2 is connected to terminal 1226 of unit 176. Section 12 of swtich 130, 130–12 has its common connection to positions 1, 2, 3, 4 and 6 of the fifth section 114–5 of switch 114, position 1 of 130–12 has its connection to position 1 of 132–1, to position 4 of 132–1, to position 5 of 114–5, to position 5 of 114–6, to position 2 of 132–2, to position 2 of 130–13 and to position 3 of 132–4. Position 2 of 130–12 is connected to position 2 of 132–1, position 1 of 132–2, position 1 of 130–13, position 4 of 132–2, and to the common connections 132–4 and 132–5.

Section 1 of switch 132–1 has its common connection as described above to terminals 2 of jacks 126 and 128. Position 1 2, 3 and 4 are connected as described above. Switch 132–2 has its common connection as described above to pins 1503 and 1603 of jacks 126 and 128. Positions 1, 2, 3, and 4 are connected as described above. Switch 132–3 has its common connection to terminal 306 of power supply 172. Positions 1 and 2 of switch 132–3 are as described above. Positions 3 and 4 are not connected. Switch 132–4 has its common connection as described above. Positions 2 and 4 are not connected and position 3 is connected as described above. Common connection of 132–5 is as described above and positions 1, 2 and 3 are connected to the common connection of switch 130–10. The fourth position of 132–5 is not connected.

A three-prong AC plug 155 having a ground connection 161 and connections 157 and 159 is connected to a double pole single throw on-off switch 156, and the line from 157 is connected through a fuse 168 to the primary of a transformer 166. A first winding 167 on transformer 166 is applied to a tape recorder full wave power supply 169. The ends of winding 167 are applied respectively to the anodes of diodes 152 and 154, the cathodes of the diodes being connected together and to the positive end of electrolytic capacitor 162 and to an output pin 163 on a recorder output jack 171. Pin 165 is connected in parallel with pin 163. The center tap 1408 from secondary winding 167 is connected to the negative end of capacitor 162 and to pin 167 of jack 171. A further secondary winding 173 on transformer 166 provides an isolated AC input for power supply 172. The extremities of secondary winding 173 are applied respectively to terminals 316 and 314 of power supply 172, and the other tap is applied to terminal 318 of power supply 172. Power supply 172 is of conventional design and provides a negative and positive 12 volt outputs against ground for powering the modulator and EIA level converter units 170 and 176 and the demodulator and carrier detect units 174 and 178. Power supply 172 is connected to terminal 228 of unit 170 via terminal 312, to terminal 236 of unit 170 via terminal 308, and to terminal 232 of unit 170 via terminal 304. Terminal 312 is further connected to terminal 1228 of unit 176, 308 is connected to terminal 1236 of unit 176, and terminal 304 is further connected to terminal 1232 of unit 176. In addition the −12 volt output on terminal 308 is connected to the second terminal of carrier detect lamp 158 and to the second terminal of data transfer lamp 160. Power supply 172, modulator and EIA level converters 170 and 176 and demodulator and carrier detect units 174 and 178 comprise the conventional data set assembly 180 which is described in greater detail in FIGS. 2 and 3.

Figure 3:
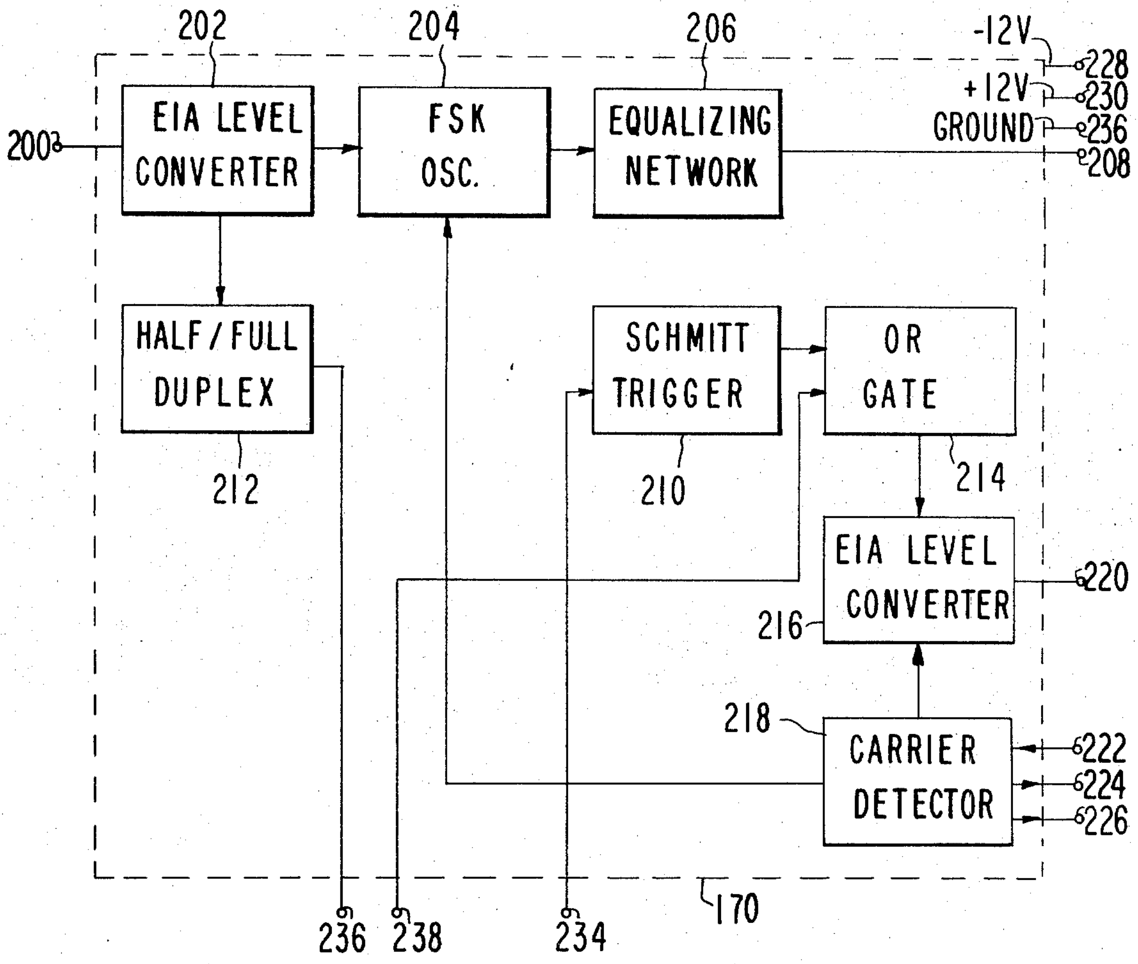
FIGS. 3 and 4 are block diagrams of portions of the data set employed in the DS/TT.

Referring now to FIG. 3, the modulator and EIA level converter 170 and 176 is shown in greater detail. Units 170 and 176 differ from each other only in the frequencies generated by the oscillators. Therefore, reference will be made to only one of the units, 170. A bilevel DC input appears at terminal 200 and is applied to an EIA level converter 202. The level converter provides two outputs, first to an FSK oscillator 204 and to a half/full duplex unit 212. The function of the duplex unit will be described below. FSK oscillator 204 provides a modulated output at a first or second set of two frequencies, either at 1,070 and 1,270 hertz or at 2,025 and 2,225 hertz in response to the bilevel inputs. Unit 170 provides frequencies at the first mentioned frequencies and unit 176 provides the other set of frequencies. These are the standard FSK modulating frequencies used to transmit data over telephone lines. The output of the FSK oscillator is applied to an equalizing network 206 which provides equal amplitudes at the two generating frequencies to an output terminal 208. Schmitt trigger 210 receives an input from terminal 234 and its output is applied as a first input to "OR" gate 214, the second input to the "OR" gate is received from half/full duplexing at 212. An EIA level converter 216 takes the output of "OR" gate 214 and applies it to output terminal 220. Half/full duplex unit 212 is also connected to terminals 236 and 238. The function of the Schmitt trigger and associate circuitry will be described below.

The modulator and EIA converter unit also contains carrier detector circuit 218 receiving an input from terminal 222 and providing outputs at terminals 224 and 226. Carrier detector 218 also controls FSK oscillator 205 to inhibit oscillation when no signal carrier is present. Carrier detector 218 also controls the EIA level converter 216 to prevent outputs under conditions of no input signal. Voltage inputs of −12 volts, +12 volts and ground are applied to terminals 228, 230 and 236, respectively.

Figure 4:
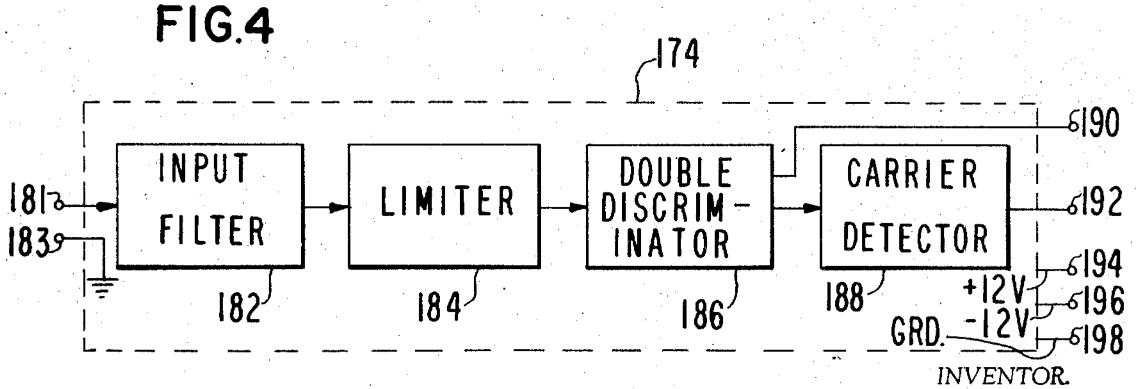

Referring now to FIG. 4, demodulator and carrier detect unit 174 or 178 is shown. As with the modulator unit, the demodulators differ only in the frequencies at which they operate. Unit 174 demodulates FSK frequencies at 2,025 and 2,225 hertz. An FSK modulated input is applied at terminal 181 and ground terminal 183 to a sharply tuned input filter 182 that eliminates noise and unwanted signals. The filter output is applied to a three-stage hard limiter 184 which provies an output to double discriminator 186 of conventional design tuned to the mark and space frequencies, 2,025/2,225 or 1,070/1,270 hertz to detect the mark and space signals and provide a DC signal at terminal 190. A carrier detector unit 188 also receives a discriminator output, provides additional filtering, and has an integrating amplifier and functions to provide an output at terminal 192 when a carrier signal is positively present. Terminals 194, 196 and 198 receive −12 volt, +12 volt, and ground power inputs, respectively.

The DC output from terminal 190 is applied at terminal 234 of modulator unit 170 where it keys a Schmitt trigger and is level adjusted in unit 216 to provide the standard bilevel binary output on terminal 220.

Referring again to FIG. 1 of the drawings, the functions of the various switches will be described in connected with circuit diagrams of FIGS. 2, 3 and 4. In order to facilitate understanding the operation of the invention, the description will be broken down into various functions performed by the apparatus.

Referring first to certain signal paths and functions that will be helpful in understanding the invention, with inputs to tape recorder 320, when switch 114, the tape I/O switch, is in position 1, "REC TX," or position 3, "REC RX," the signal from jacks 110 and 112 are applied to the tape recorder input via isolation transformer 116. These signals are FSK modulated and are compatible with the frequencies of the DS/TT unit. Other inputs to the tape recorder occur when switch 114 is in position 5, DS (data set) TX(transmit) and position 6 DS (data set) RX (receive). In the latter two positions the FSK outputs of data set 180 are applied.

For uses as an Acoustical Data Set wherein an FSK modulated carrier is applied to receiver 104 of the acoustical coupler 102, switch 108, the coupler switch, is put in duplex position, applying a signal to the demodulator 174 when switch 130 is in the originate position and applying a signal to the modulator 178 when switch 130 is in the answer position. Demodulators 174 and 178 feed modulator 170 and 176 to remodulate the signals and provide outputs to acoustical speaker 106 from modulator 170 when switch 130 is in the originate position and from modulator 176 when switch 130 is in the answer position. Thus, the unit can operate as an Acoustical Data Set providing FSK outputs at either set of frequencies depending on whether switch 130 is thrown in the originate or answer position. Note that only in duplex position is the acoustical coupler receive transducer connected. This prevents random room noises from being picked up during other functions.

Referring now to the carrier detect function, lamp 158 lights automatically when a modulated signal is applied to the data set from the tape unit or acoustical coupler. Thus, if there is an input to terminal 181 of unit 174 or 1181 of unit 178, then pins 1508, 1608 and 1505, 1605 of the EIA interface jacks 126, 128 rise from −6 to +12 volts via pins or outputs 226 or 1126 of the modulators. When in the originate mode of switch 130, a carrier from modulator 170 terminal 208 is transmitted through the acoustic transducer. A bilevel output from terminal 220 or 1220 of a modulator 170 or 176 goes to the EIA receive terminal 1503, 1603 when switch 132 is in data set position and to pin 1502, 1602 of the EIA plug when the switch is in terminal simulate position. When the carrier detect is disabled, the output terminals 220 and 1220 of the modulators are −6 volts, thus disabling the terminal equipment. The output of those terminals also are applied to data transfer lamp 160 which light on passage of mark signals from the modulator units.

Referring now to the digital or bilevel DC inputs of the unit, when switch 132 is in positions 1 or 2, "data set" or "terminal simulator," then pins 1502, 1602 and 1503, 1603 of the EIA interface jacks 126 and 128 provide bilevel signals which key modulators 170 and 176. In the originate mode of switch 130, pin 1502, 1602 keys terminal 200 of modulator 170 and the output of demodulator 174 keys pin 1200 of modulator 176. In the answer mode the reverse occurs. The modulated outputs of units 170 and 174 are applied to the acoustic transducer or the record input of the magnetic tape unit.

Referring now to the control functions of the unit. Switch 156, AC power on/off, controls all power in the DS/TT.

COUPLER

Switch 108-coupler, permits the user to transmit via the acoustical transducer 102 with originate (F1–1,070/,270 hertz) or answer (F2–2,025/2,225 hertz) frequencies, the choice of which depends on the receiver circuitry at the end of the communications link. The receiver acoustic transducer unit 104 is disconnected except in the duplex position. In the local position, switch 108, enables the user to perform two functions, first, to enable the EIA compatible terminal 126 and 128 by bringing pins 1508, 1608 and 1505, 1605 of the terminals from −6 volts to +12 volts when a carrier is not present. This allows the user to enter keyboard data into the tape recorder "off-line" and it inhibits the transmit transducer.

One use for the local position is to type a program on tape, then play back the tape on transmit to the remote computer or to another office.

ORIGINATE/ANSWER

Switch 130, originate/answer provides the following characteristics. When in the originate position, both the originate ("O"–1,070/1,270 Hz) and answer ("A"–2,025/2,225 Hz) oscillators are operational. The "O" signal is connected electrically to the transmit transducer 106 when the switch 108 (coupler) is in either duplex or transmit F1 positions. The output of the "O" oscillator is inhibited unless the signal on the band of 2,000 to 2,300 hertz is being delivered to the originate demodulator 174 from either the playback portion of the magnetic recorder or the receiver acoustic transducer. When the carrier signal in the proper band occurs for 1 to 1½ seconds, the carrier detect lamp 158 on the control panel will be lighted and the data set ready (pins 1505, 1605 of jacks 126 and 128) and the clear to send (pins 1508, 1608 of jacks 126 and 128) lines will go from −2 to +12 volts. The EIA output for the received data (pins 1503, 1603) will be normally held in the mark hold position (−6 volts) until an adequate carrier is detected as described in the preceding explanation.

In the answer position, as in the originate position, the "O" and "A" oscillators are operational. The "A" signal is connected to the transmit transducer 106 when switch 108 is in the duplex or F2 positions. The output of the "A" oscillator is inhibited unless the signal on the band 1,070–1,270 hertz is being delivered to the originate demodulator 174 from either the playback portion of the magnetic recorder or the receive acoustic transducer. In other respects, the unit functions as in the originate position. When the system is being utilized as an answer data set, the transmitted tone (F2) will not be inhibited by the carrier detect circuitry. This is to enable the originating data set to effect the necessary "hand shake" operation.

MODE

Referring now to mode switch 132, this switch makes it possible for the user to perform many different functions with the DS/TT. When switch 132 is in position 1, the data set position, the system functions as an acoustically coupled data set as described hereinbefore. It is possible for the user to record either the signal being set from the terminal or the signals received from the remote computer. If switch 131 is in the half duplex position, the user may record both sides of the conversation.

When the switch 132 is in the terminal simulator position, position 2, the DS/TT EIA interface (jacks 126 and 128) exhibits the characteristics of a terminal. That is, it generates and receives EIA compatible signals to interface with another data set; pins 1502, 1602 delivers signals between −6 volts and +12 volts to the data set; pins 1503, 1603 accepts EIA compatible voltage levels from the data set 180; and pins 1504, 1604 and 1520, 1620 deliver plus 12 volts signals to the EIA interface. This capability enables the user to exercise other data sets to determine their operational state.

In the transmit tape position, position 3 of switch 132, the tape recorder output can be demodulated by the received circuitry and the digital levels are used to modulate either the O or the A oscillators and to subsequently transmit F1 or F2 frequencies via the acoustical transducer. This capability makes it possible to exchange test tapes for computer programs with individuals having access to another DS/TT system.

In the monitor EIA position, position 4 of switch 132, the user can cause the system to monitor the digital levels that are being transferred between the terminal and another EIA compatible data set. The electrical interface between DS/TT and the monitored equipment is such that their operating characteristics will not be affected. In this mode it is possible to monitor either the send signal or the receive signal, but not both at the same time. This particular mode is most useful when attempting to diagnose operational deficiencies of the system.

TAPE I/O

Switch 114, the tape I/0 (in/out) switch has been described to some extent above. In connection with this switch, it should be noted that if switch 130 is the answer position, the tape recorder input is from the "O" oscillator and in order to play back the tape it is necessary for the DS/TT to be equipped with the answer demodulator 178. It is possible to omit the modulator and carrier detect unit 178 from the DS/TT unit and still retain a majority of the functions described herein. For example, by being sure that switch 130 is in the originate position at all times, the necessity for having demodulator and carrier detector 178 in order to play back a tape is not necessary. When switch 114 is in position 1, 2, 3 or 4, the tape recorder is electrically coupled to the 4 pin MODEM receptacles 110, 112 via isolation transformer 116 which has a nominal characteristic impedance of 5,000 ohms. over the frequency range of from 60 to 15,000 hertz. If the system is used to monitor an operating communications line with a terminal place, there will be less than 1 DB degradation of a received signal because of the additional load placed on the line because of the DS/TT. In the record transmit position, position 1, the transmit pair in the MODEM interface is coupled through the isolation transformer to the record circuitry of the magnetic tape unit. In the playback transmit position, position 2, the transmit pair of the MODEM interface is coupled through the isolation transformer to the playback circuitry of the magnetic tape unit. In the record/receive position, position 3, the receiver pair from the MODEM interface is coupled through the isolation transformer to the record circuitry of the magnetic tape unit. In the playback receive position, the receive pair of the MODEM interface is coupled through the isolation transformer to the playback circuitry of the magnetic tape unit. The playback volume control of the tape unit is used to adjust the signal level as it is in the playback transmit positions. Positions 5 and 6 of switch 114 relate to Acoustical Data Set functions and are influenced by switches 108, 130, 132, and 131. When switch 114 is in the data set transmit position, the Acoustical Data Set delivers signals to the record circuitry when the magnetic tape unit is in the record position and receives signals from the magnetic tape unit when it is in the playback position. In order to cause the F2 oscillator to be modulated when playing back a tape, it is necessary to switch switch 114 to the receive position or switch 132 to the transmit tape position. When switch 114 is in the receive position, position 6, the Acoustical Data Set is either delivering or receiving signals from the magnetic tape unit, depending on whether the tape recorder is in the receive or playback position.

Switch 131, the full duplex/half duplex switch, enables the user to interface with a teletype terminal that is wired for full duplex operation and the remote computer is programmed to operate in only the half duplex mode. Thus by placing switch 131 in the half duplex position, the send data is electrically coupled into the receiver circuitry and the teletype printer mechanism can be operated from the keyboard. In those cases where the service engineer of a non-teletype terminal can generate or inhibit certain control functions, this feature makes it possible to record both sides of the conversation. However, under normal operating conditions, switch 131 is left in the full duplex position. Reference can be made to FIG. 3 in block 212 thereof and to FIG. 2 wherein switch 131 controls the closure of contacts between terminals 236 and 238. In the half duplex mode, connection is made between terminals 236 and 238, thus providing an output from the EIA level converter directly to the "OR" gate which is combined with the signal from the demodulator through terminal 234 thus providing half duplex operation as described.

The DS/TT is used properly is capable of operating in conjunction with all presently available terminals operating at data rates up to 300 baud. Although there are so many possible applications of the DS/TT, frequent use will be to make normal data calls. This can be accomplished by the following procedures:

1. Place switch 156 in the off position.
2. Make sure that the magnetic tape unit is in its off position.

3. Connect the proper "data" cable to the terminal using jacks 110–112 or 126–128.
4. Set the coupler switch 108 to duplex.
5. Set mode switch 132 to data set.
6. Set originate/answer switch 130 to proper position.
7. Set full/half duplex switch to proper position.
8. Turn the AC power on. The data transfer lamp 160 should be lighted: a carrier detect lamp 158 and the 1,070 hertz transmit carrier will normally come on for less than 1 second and then go off.
9. Turn the terminal device on.
10. Dial the digit sequence to reach the desired station. Listen for ringing and proper tone.
11. Place telephone handset in acoustic transducer with the mouthpiece closest to the front of the case.
12. Note carrier detect lamp is lighted and that terminal is enable.
13. Proceed with desired operation.

Other procedures may be performed including the following:

1. To record transmitted data, set tape I/O switch 114 to DS/TX and activate magnetic tape unit.
2. To record received data, set tape I/O switch 114 to DS/RX and activate magnetic tape unit. (Operations 1 and 2 can be performed in any position of the mode switch except in position 3).
3. To play back a tape of the local terminal, set the coupler switch 108 to transmit F2, thus enabling the user to monitor the recorded data.
4. To transmit the recorded tape to a remote terminal or computer, set the mode switch 132 to transmit tape. If calling another DS/TT or an originate data set, turn the coupler switch to transmit F2. If calling a remote computer or another answering data set, position the coupler switch to transmit F1.
5. To use with an ASR 33 teletype properly wired for 20 milliampere loop, full duplex operation and communicating with a remote terminal or computer employing only half duplex logic (as most systems do), set the half/full switch to half.

Another additional use for the unit is to store business letters on tape. This can be done as follows: get on line to the remote computer, type in a letter using local business machine, make any necessary corrections in letter, have computer print corrected copy while recording the signals on the DS/TT magnetic recorder. The tape may then be used to type out copies of the letter as need. Of course, insertions may be made as desired.

It will be apparent to those of ordinary skill in the art that many other functions are possible with the DS/TT as described and the invention is to be in no way limited in its operation to the specific functions described herein. Also, the specific physical embodiment in a portable case is not to be considered limiting. Moreover, it is apparent that units capable of recording and playing back audio in the 1,000–2,300 Hz range may be used in place of the unit described herein.

Various modifications to the DS/TT may be apparent to those of ordinary skill in the art. For example, a second magnetic tape unit could be used in conjunction with the DS/TT so that playback and record functions could be carried on at the same time. This capability would be useful, for example, in checking out a remote terminal by playing and recording incrementally.

I claim:

1. Acoustical data set/terminal tester apparatus comprising:

means for electrically interfacing with a bilevel DC data signal to provide a signal;

bilevel DC modulator means for FSK modulating said signal to provide an FSK signal as a first signal, means for electrically interfacing with an FSK modulated data signal, said FSK signal having a mark frequency and a space frequency, to provide a second signal;

means for receiving an FSK signal by acoustically interfacing with a telephone type handset to provide a third signal;

acoustic FSK transmitting means for transmitting an FSK signal by acoustically interfacing with a telephone type handset;

FSK demodulator means for demodulating an FSK signal to provide bilevel DC signal in response thereto;

record/playback means for playing back an FSK modulated signal, as a fourth signal and for recording an FSK modulated signal; and switching means for selecting an input signal from one of said first signal, second signal, third signal and fourth signal, and for applying said selected input signal to one of said record/playback means, acoustic FSK transmitting means, and FSK demodulator means.

2. The apparatus of claim 1 wherein said means for demodulating and modulating comprises a data set.

3. The apparatus of claim 2 wherein said means for electrically interfacing with an FSK modulated signal comprises isolation transformer means, and a four-pin telephone-type jack.

4. The apparatus of claim 3 wherein said means for electrically interfacing with said bilevel DC signals comprises, a 25 pin business machine jack, and level converter means.

5. Acoustical data set/terminal tester apparatus comprising:

means for electrically interfacing with a bilevel DC data signal to provide a signal;

bilevel DC modulator means for FSK modulating said signal to provide an FSK signal as a first signal, means for receiving an FSK signal by acoustically interfacing with a telephone type handset to provide a second signal;

record/playback means for playing back a recorded FSK modulated signal as a third signal and for recording an FSK modulated signal;

acoustic FSK transmitting means for transmitting an FSK signal by acoustically interfacing with a telephone type handset;

FSK demodulator means for demodulating an FSK signal to provide a bilevel DC signal in response thereto;

switching means for selecting an input signal from one of said first signal, second signal, and third signal, and for applying said selected input signal to one of said record/playback means, acoustic FSK transmitting means, and FSK demodulator means.

6. Acoustical data set/terminal tester apparatus comprising:

means for electrically interfacing with an FSK modulated data signal, said FSK signal having a mark frequency and a space frequency, to provide a first signal;

means for receiving an FSK signal by acoustically interfacing with a telephone type handset to provide a second signal;

record/playback means for playing back a recorded FSK modulated signal as a third signal and for recording an FSK modulated signal;

acoustic FSK transmitting means for transmitting an FSK signal by acoustically interfacing with a telephone type handset;

FSK demodulator means for demodulating an FSK signal to provide a bilevel DC signal in response thereto; and switching means for selecting an input signal from one of said first signal, second signal, and third signal, and for applying said selected input signal to one of said record/playback means, acoustic FSK transmitting means, and FSK demodulator means.

* * * * *